United States Patent
Buskens et al.

(10) Patent No.: US 7,614,055 B2
(45) Date of Patent: Nov. 3, 2009

(54) SELECTING A PROCESSOR TO RUN AN EXECUTABLE OF A DISTRIBUTED SOFTWARE APPLICATION UPON STARTUP OF THE DISTRIBUTED SOFTWARE APPLICATION

(75) Inventors: Richard W. Buskens, Robbinsville, NJ (US); Tim T. Liim, Holmdel, NJ (US); Yow-Jian Lin, Edison, NJ (US); Sunil K. Mishra, Aurora, IL (US); Muhammad A. Siddiqui, Monmouth Junction, NJ (US); Timothy A. Suchaczewski, Somonauk, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 926 days.

(21) Appl. No.: 10/868,404

(22) Filed: Jun. 14, 2004

(65) Prior Publication Data

US 2005/0278712 A1  Dec. 15, 2005

(51) Int. Cl.
*G09F 9/46* (2006.01)

(52) U.S. Cl. .................... 718/102; 718/100; 718/105; 717/100; 717/168; 717/170; 717/172

(58) Field of Classification Search ............... 717/168, 717/170, 172; 718/102, 105, 108, 110, 100
See application file for complete search history.

(56) References Cited

U.S. PATENT DOCUMENTS

| | | | | |
|---|---|---|---|---|
| 4,748,558 A * | 5/1988 | Hirosawa et al. | ............ | 718/105 |
| 5,053,950 A * | 10/1991 | Naganuma et al. | .......... | 718/105 |
| 5,115,505 A * | 5/1992 | Bishop et al. | ................ | 718/104 |
| 5,241,677 A * | 8/1993 | Naganuma et al. | .......... | 718/105 |
| 5,548,737 A * | 8/1996 | Edrington et al. | ............ | 712/200 |
| 5,630,129 A * | 5/1997 | Wheat | ........................ | 718/105 |
| 5,898,870 A * | 4/1999 | Okuda et al. | ................. | 718/104 |
| 5,935,216 A * | 8/1999 | Benner et al. | ................ | 709/248 |
| 6,247,077 B1 * | 6/2001 | Muller et al. | .................. | 710/74 |
| 6,327,607 B1 * | 12/2001 | Fant | ............................ | 709/201 |
| 6,629,263 B1 * | 9/2003 | Sassi | ............................ | 714/15 |
| 6,704,768 B1 * | 3/2004 | Zombek et al. | .............. | 709/201 |
| 6,782,408 B1 * | 8/2004 | Chandra et al. | ............... | 718/104 |
| 6,865,591 B1 * | 3/2005 | Garg et al. | .................... | 709/201 |
| 6,925,642 B1 * | 8/2005 | Commander | ................. | 718/104 |
| 7,024,671 B2 * | 4/2006 | Yamashita | .................... | 718/102 |
| 2002/0004913 A1 * | 1/2002 | Fung | ............................ | 713/300 |
| 2002/0099759 A1 * | 7/2002 | Gootherts | .................... | 709/105 |
| 2004/0117794 A1 * | 6/2004 | Kundu | .......................... | 718/102 |
| 2005/0005200 A1 * | 1/2005 | Matena et al. | ................. | 714/38 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner*—Wei Y Zhen
*Assistant Examiner*—Matthew J Brophy
(74) *Attorney, Agent, or Firm*—Carmen Patti Law Group, LLC (57) ABSTRACT

An apparatus in one example comprises a manager component for a distributed software application that based on one or more of a characteristic of an executable of the distributed software application and/or a characteristic of one or more of a plurality of processors, selects a processor from the plurality of processors to run the executable upon startup of the distributed software application.

23 Claims, 2 Drawing Sheets

SELECTING A PROCESSOR TO RUN AN EXECUTABLE OF A DISTRIBUTED SOFTWARE APPLICATION UPON STARTUP OF THE DISTRIBUTED SOFTWARE APPLICATION

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., co-filed herewith;

"SOFTWARE COMPONENT INITIALIZATION IN AN ORDERED SEQUENCE," by Buskens, et al., co-filed herewith;

"SHUTTING DOWN A PLURALITY OF SOFTWARE COMPONENTS IN AN ORDERED SEQUENCE," by Buskens, et al., co-filed herewith;

"DISTRIBUTED SOFTWARE APPLICATION SOFTWARE COMPONENT RECOVERY IN AN ORDERED SEQUENCE," by Buskens, et al., co-filed herewith;

"MANAGER COMPONENT FOR CHECKPOINT PROCEDURES," by Buskens, et al., co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., co-filed herewith;

"MANAGER COMPONENT RESOURCE ADDITION AND/OR RESOURCE REMOVAL ON BEHALF OF DISTRIBUTED SOFTWARE APPLICATION," by Gong, et al., co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The executables of the distributed software application may all run on a single processor or may be divided up and run across a plurality of processors.

To divide the executables across the plurality of processors, an administrator writes a configuration file that sets, at compile time, a fixed relationship between various executables and processors. For example, the configuration file may indicate that each of the executables is always run on a specific processor. Upon any startup of the distributed software application, the executables run on the pre-assigned processors.

The functionality of the distributed software application in one example is separated into two executables (i.e., first and second executables). The system that runs the software application in one example has two processors (i.e., first and second processors). At some point before runtime of the distributed software application, the administrator assigns the first executable to one of the processors and assigns the second executable to one of the processors. For example, the administrator may declare in the configuration file that the first executable is to be run on the first processor and the second executable is to be run on the second processor.

As one shortcoming, the assignment of the executables to the processors is fixed prior to runtime. At each startup of the distributed software application, the executables are run on the same processors regardless of the condition of the system. As another shortcoming, the administrator is unable to completely plan for changing load conditions of the processors. At the time of creation of the configuration file, the administrator may not have a complete picture of the load of the system that runs the distributed software application. The configuration file may pre-assign an executable to a processor when the current condition of system would make it beneficial to assign the executable to a different processor.

Thus, a need exists for an enhanced selection of a processor from a plurality of processors to run an executable of a distributed software application.

SUMMARY

A manager component for a distributed software application dynamically assigns each of the executables of the distributed software application to be run by one of the processors in a multi-processor system. At runtime, the manager component employs operational requirements from a configuration file and/or system parameters to dynamically select one processor from a plurality of available processors. The selected processor is then responsible for running the assigned executable. Dynamically assigning the executables to processors at runtime may serve to balance the load of the system or keep related executables of the software application on the same processor or separate processors.

In one embodiment, there is provided an apparatus comprising a manager component for a distributed software application that based on one or more of a characteristic of an executable of the distributed software application and/or a characteristic of one or more of a plurality of processors, selects a processor from the plurality of processors to run the executable upon startup of the distributed software application.

In another embodiment, there is provided a method for: determining one or more characteristics of one or more of a plurality of processors that run a distributed software application; and selecting, at runtime of the distributed software application and based on one or more of the one or more characteristics, a processor from the plurality of processors to run an executable of the distributed software application.

In yet another embodiment, there is provided a method for: determining one or more characteristics of an executable of a distributed software application; and selecting, at runtime of the distributed software application and based on one or more of the one or more characteristics, a processor from a plurality of processors to run the executable.

DESCRIPTION OF THE DRAWINGS

Features of exemplary implementations of the invention will become apparent from the description, the claims, and the accompanying drawings in which:

DETAILED DESCRIPTION

Figure 1:
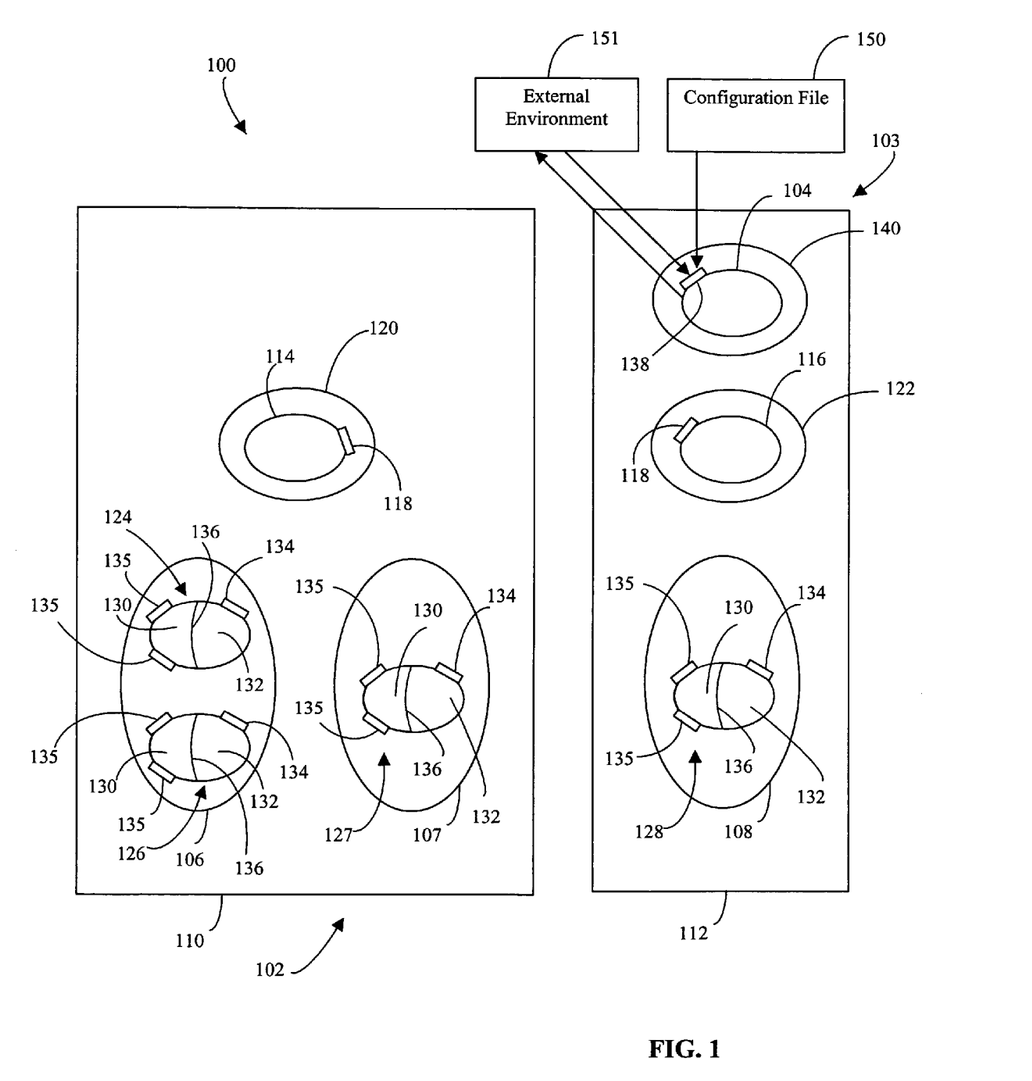
FIG. 1 is a representation of an exemplary implementation of an apparatus that comprises a distributed software application and a management infrastructure.

Turning to FIG. 1, an apparatus 100 in one example comprises a distributed software application 102 and a management infrastructure 103. The management infrastructure 103 performs one or more management operations on the distributed software application 102. The management infrastructure 103 comprises a manager component 104. For example, the manager component 104 may coordinate one or more of starting, stopping, initializing, shutting down, and monitoring the distributed software application 102, detecting failures of the distributed software application 102, recovering the distributed software application 102, propagating state changes about distributed software application 102, and the like.

The distributed software application 102 represents a software application divided among a plurality of executables (i.e., software capsules or software entities). For example, the distributed software application 102 comprises a plurality of executables 106, 107 and 108. The distributed software application 102 may run on a single central processing unit ("CPU") or may be divided between multiple CPUs, such as processors 110 and 112. The processor 110 comprises an executable manager 114 and the processor 112 comprises an executable manager 116. The executable managers 114 and 116 in one example are part of the management infrastructure 103.

The executable managers 114 and 116 start, stop and monitor executables of the distributed software application 102 that run on the processors 110 and 112, such as the executables 106, 107 and 108. To start or stop the executable 106, the executable manager 114 invokes operating system commands to start or stop the executable 106. The executable managers 114 and 116 monitor communication channels and/or diagnostics on behalf of the executables 106, 107 and 108. Should one or more of the executables 106, 107 and 108 fail, the respective one of the executable managers 114 and 116 informs the manager component 104.

To detect failures of the executables 106, 107 and 108 the executable managers 114 and 116 register with an operating system to receive notifications when the executables 106, 107 and 108 terminate either abnormally or as a result of explicit commands sent to the executables 106, 107 and 108. To detect failures of software components 124, 126, 127 and 128 within the executables 106, 107 and 108, the executable managers 114 and 116 send status queries to the software components 124, 126, 127 and 128 and expect to receive status responses from the software components 124, 126, 127 and 128.

Each of the executable managers 114 and 116 comprise a communication interface 118 for communication with the manager component 104. The executable managers 114 and 116 receive instruction from the manager component 104. For example, the executable managers 114 and 116 may receive instructions at the communication interface 118 from the manager component 104. The executable manager 114 is encapsulated in an executable 120 running on the processor 110 and the executable manager 116 is encapsulated in an executable 122 running on the processor 112.

The executables 106, 107 and 108 comprise one or more software components 124, 126, 127 and 128. For example, the executable 106 encapsulates the software components 124 and 126, the executable 107 encapsulates the software component 127, and the executable 108 encapsulates the software component 128. Within each of the executables 106, 107 and 108 may be tens, hundreds, or even thousands of other software components (e.g., analogous to the software components 124, 126, 127 and 128).

The software components 124, 126, 127 and 128 represent software sub-entities of the executables 106, 107 and 108. For example, the software components 124, 126, 127 and 128 represent logical blocks of software of the executables 106, 107 and 108. The software components 124 and 126 in one example are developed independently and then put together within the executable 106. The software components 124, 126, 127 and 128 each perform some portion of the overall functionality of the distributed software application 102. The software components 124, 126, 127 and 128 work together to make the distributed software application 102 achieve the desired operation. The distributed software application 102 may provide any functionality for a computer system. The distributed software application 102 in one example comprises a call processing software application. For example, the distributed software application 102 sets up and/or tears down telecommunication sessions in a telecommunication network.

In one embodiment, each of the software components 124, 126, 127 and 128 comprise application software 130, management support software 132, a management support software communication interface 134, and one or more application software communication interfaces 135. The software components 124, 126, 127 and 128 employ the management support software communication interfaces 134 to receive communications from the manager component 104. The software components 124, 126, 127 and 128 employ the application software communication interfaces 135 to receive communications from other software components of the software components 124, 126, 127 and 128. An application programming interface ("API") 136 communicatively couples the application software 130 with the management support software 132 in each of the software components 124, 126, 127 and 128. The application software 130 and the management support software 132 can exchange information through the application programming interface 136.

The application software 130 is the portion of the software components 124, 126, 127 and 128 that performs some portion of the overall functionality of the distributed software application 102. The management support software 132 is the portion of the software components 124, 126 and 128 that cooperates with the manager component 104 to perform management operations on the software components 124, 126 and 128. The application software 130 is part of the distributed software application 102 and the management support software 132 is part of the management infrastructure 103.

An application developer creates the application software 130 of the software components 124, 126, 127 and 128 to achieve the designated functionality of the software components 124, 126, 127 and 128. For example, the application developer creates the application software 130 of the software components 124, 126, 127 and 128 to achieve the overall functionality of the distributed software application 102.

To alleviate the application developers from being required to write software into each of the software components 124, 126, 127 and 128 to interface with the manager component 104, a code generator in one example automatically generates the management support software 132. To create the management support software 132, a configuration file 150 in one example is input into the code generator. The configuration file 150 comprises connection information and/or architecture information of the distributed software application 102. The code generator creates code for the management support software 132. The code for the management support software 132 is compiled and linked with the application software 130 in the software components 124, 126, 127 and 128. The management support software 132 may be different for each of the software components 124, 126, 127 and 128, as will be appreciated by those skilled in the art.

The manager component 104 comprises a communication interface 138 for receiving incoming communications. The communication interface 138 is employable for receiving the configuration file 150. The manager component 104 may employ other means to receive the configuration file 150, such as reading the configuration file 150 directly from a disk or file system. The communication interface 138 may receive communications from the executable managers 114 and 116, as well as communications from the software components 124, 126, 127 and 128.

The manager component 104 may also use the communication interface 138 for receipt of external system information from an external environment 151. In one example, the external environment 151 represents other components of the system that are in communication with the manager component 104. In another example, the external environment 151 represents another management infrastructure in communication with the management infrastructure 103.

The manager component 104 is encapsulated with zero or more other software components in an executable 140. The executable 140 that contains the manager component 104 may be run on either of the processors 110 and 112. The manager component 104 in one example is active and the apparatus 100 may have one or more standby manager components (e.g., analogous to the manager component 104). If the manager component 104 fails, then one of the standby manager components becomes active and gains managerial control of the distributed software application 102.

Upon startup of the manager component 104, the manager component 104 identifies which processors of the system are up and running. For example, the manager component 104 determines that the processors 110 and 112 are up and running. Upon startup of the distributed software application 102, the manager component 104 selects one of the processors 110 and 112 to run each of the executables 106, 107 and 108 of the distributed software application 102. The manager component 104 in one example dynamically chooses the processor 110 from the plurality of processors 110 and 112 for the executable 107 at runtime of the distributed software application 102. The manager component 104 employs characteristics of the executables 106, 107 and 108 and/or one or more characteristics of one or more of the plurality of processors 110 and 112 to select a processor from the plurality of processors 110 and 112 to run each of the executables 106, 107 and 108.

The management infrastructure 103 provides management functionality as a reusable asset for distributed software applications. The management infrastructure 103 in one example comprises a portion of a high availability ("HA") infrastructure. The manager component 104 in one example comprises a high availability manager component operating in a high availability infrastructure. The high availability infrastructure controls management operations on the software components 124, 126, 127 and 128 for the distributed software application 102. For example, the high availability manager component selects between the processors 110 and 112 to run the executables 106, 107 and 108 for the distributed software application 102. The high availability infrastructure is usable to control management operations for the distributed software application 102 or another distributed software application. The high availability infrastructure is able to continue processing while switching between active and standby components in the high availability infrastructure.

One advantage to the manager component 104 dynamically selecting one of the processors 110 and 112 for the executable 107, or analogously for the executables 106 and 108, at runtime is that the manager component 104 is able to employ up to date information of the system to make a decision of which one of the processors 110 and 112 should run the executable 107. For example, the manager component 104 may employ load information of the processors 110 and 112 to choose the processor 110 for the executable 107 if the processor 110 has a lower load than the processor 112 at the time the executable 107 is assigned.

The executable 107 in one example is free from a fixed pre-assignment to any one of the processors 110 and 112. Between startups, the manager component 104 is able to change which one of the processors 110 and 112 runs the executable 107. For example, upon a first startup of the distributed software application 102, the manager component 104 may select the processor 110 to run the executable 107. Upon a second startup of the distributed software application 102, the manager component 104 may select the processor 112 to run the executable 107.

The manager component 104 may decide to run the executable 107 on the processor 110 for the first startup and then the processor 112 for the second startup because of changing conditions within the system. For example, between the first startup and the second startup, one or more characteristics of the executable 107 and/or one or more characteristics of the plurality of processors 110 and 112 may have changed. The changes within the system may result in the manager component 104 selecting the processor 112 to run the executable 107 at the second startup instead of again selecting the processor 110. Running the executable 107 on the processor 112 at the second startup may be more beneficial to the system and/or the distributed software application 102 than keeping the executable 107 running on the processor 110.

Figure 2:
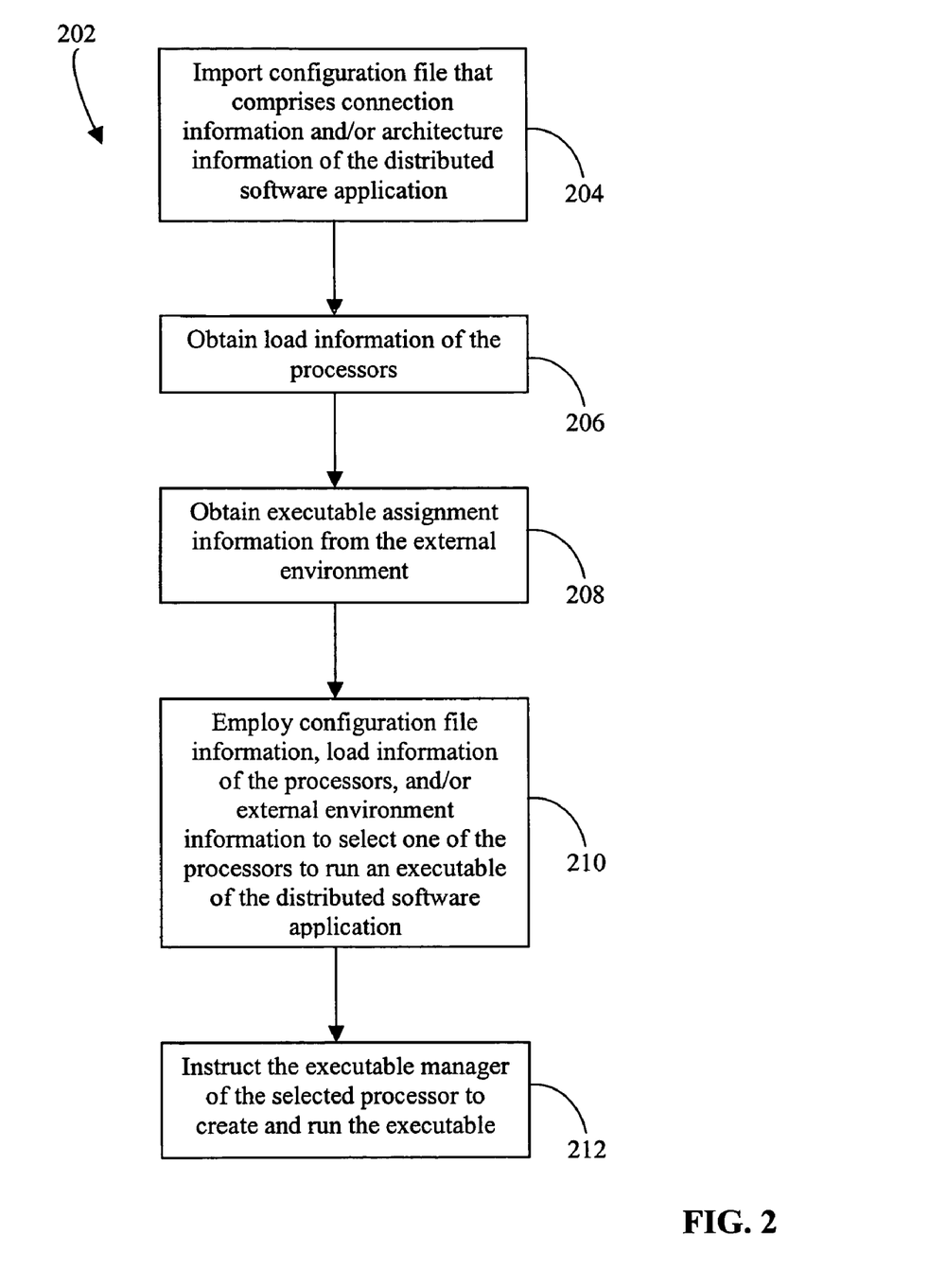
FIG. 2 is a representation of exemplary logic that serves to allow a manager component of the management infrastructure to dynamically select a processor from a plurality of processors for an executable of the distributed software application of the apparatus of FIG. 1.

Turning to FIGS. 1-2, an illustrative description of one exemplary operation of the apparatus 100 is now presented, for explanatory purposes. The manager component 104 comprises a high availability manager component operating in a high availability infrastructure. To begin operation of the apparatus 100, the distributed software application 102 is configured for control by the manager component 104, and the manager component 104 coordinates the initialization of the distributed software application 102. Exemplary logic 202 serves to allow the manager component 104 to dynamically select a processor from a plurality of processors for an executable at runtime. The logic 202 employs one or more steps, for example, STEPS 204, 206, 208, 210 and 212. The manager component 104 performs the STEPS 204, 206, 208, 210 and 212 of FIG. 2.

At STEP 204, to begin startup of the distributed software application 102, the manager component 104 receives the configuration file 150 as an input on the communication interface 138. The configuration file 150 provides information to the manager component 104 to allow the manager component 104 to control the distributed software application 102. The configuration file 150 is created to store connection information and/or architecture information of the distributed software application 102. The configuration file 150 in one example provides the manager component 104 with information about the set of executables 106, 107 and 108, the number of each type of the executables 106, 107 and 108, the mapping of the software components 124, 126, 127 and 128 to the executables 106, 107 and 108, the types of the software components 124, 126, 127 and 128, and the number of each type of the software components 124, 126, 127 and 128 in each of the executable 106, 107 and 108. At STEP 206, the manager component 104 also acquires information about the set of processors 110 and 112 that will run the distributed software application 102.

The external environment 151 in one example comprises another management infrastructure that is responsible for assigning one or more executables to available processors. The other management infrastructure may assign executables to one or more of the processors 110 and 112. At STEP 208, the manager component 104 obtains processor selection information from the other management infrastructure. For example, the manager component 104 may request the processor selection information from the other management infrastructure and wait for the response from the other management infrastructure before assigning one or more of the executables 106, 107 and 108.

At STEP 210, based on one or more characteristics of an executable (e.g., the executable 107) of the distributed software application 102, one or more characteristics of one or more of the plurality of processors 110 and 112, and/or information from the external environment 151, the manager component 104 selects a processor (e.g., the processor 110) from the plurality of processors 110 and 112 to run the executable 107 upon startup of the distributed software application 102. For example, the manager component 104 dynamically chooses the processor 110 from the plurality of processors 110 and 112 for the executable 107 at runtime of the distributed software application 102. The manager component 104 may employ information of the executable 107 received in the configuration file 150 and/or information of the processors 110 and 112 to select between the processors 110 and 112 for the executable 107. The manager component 104 in one example decides based on the available information that running the executable 107 on the processor 110 would be more beneficial than running the executable 107 on the processor 112. If one or more characteristics of the processors 110 and 112 change, then in another example running the executable 107 on the processor 112 may be more beneficial than on the processor 110.

The configuration file 150 in one example comprises a list of valid processors for each of the executables 106, 107 and 108. For example, the configuration file 150 may indicate that the executable 106 may only be run on processor 110, the executable 108 may only be run on processor 112, and the executable 107 may be run on either of the processors 110 and 112. The manager component 104 receives the configuration file 150 and selects processors for each of the executables 106, 107 and 108. For example, the manager component 104 assigns the processor 110 to run the executable 106 and the processor 112 to run the executable 108. The manager component 104 then employs the characteristics of the executable 107 and/or the characteristics of the processors 110 and 112 to dynamically at runtime select a processor from the plurality of processors 110 and 112 to run the executable 107.

In one example, the manager component 104 load balances the executables 106, 107 and 108 across the processors 110 and 112. The manager component 104 may evenly distribute the executables 106, 107 and 108 across the processors 110 and 112 based on number of executables or number of software components running on each of the processors 110 and 112. Alternatively, the manager component 104 may interact with the processors to achieve load balancing. For example, the manager component 104 queries the processor 110 for a load value of the processor 110. The manager component 104 also queries the processor 112 for a load value of the processor 112. Upon determination that the load value of the processor 110 is lower than the load value of the processor 112, the manager component 104 selects the processor 110 to run the executable 107. The load value of the processors 110 and 112 may be based on total number of executables running, total number of software components running, resources allocated, and/or resources available within the processors 110 and 112. For example, upon determination that the processor 110 is running fewer executables and/or software components than the processor 112, the manager component 104 in one example selects the processor 110 to run the executable 107.

In another example, the manager component 104 attempts to keep related executables of the executables 106, 107 and 108 on a same processor. The configuration file 150 in one example comprises an indication that the executables 106 and 107 are to be run on the same processor. Since the manager component 104 previously assigned the executable 106 to the processor 110, the manager component 104 also assigns the executable 107 to the processor 110. The configuration file 150 may alternatively comprise an indication that the executables 107 and 108 are to be run on different processors. Since the manager component 104 previously assigned the executable 108 to the processor 112, the manager component 104 assigns the executable 107 to the processor 110.

In yet another example, the manager component 104 attempts to keep related software components of the executables 106, 107 and 108 on a same processor. The configuration file 150 in one example comprises an indication that the software components 126 and 127 are to be run on the same processor. Since the software component 126 is within the executable 106 and the manager component 104 previously assigned the executable 106 to the processor 110, the manager component 104 also assigns the executable 107 that contains the software component 127 to the processor 110. The configuration file 150 may alternatively comprise an indication that the software components 127 and 128 are to be run on different processors. Since software component 128 is within the executable 108 and the manager component 104 previously assigned the executable 108 to the processor 112, the manager component 104 assigns the executable 107 that contains the software component 127 to the processor 110.

In still yet another example, the manager component 104 selects one of the processors 110 and 112 for the executable 107 based on an active-standby relationship between two of the executables 106, 107 and 108. For example, the executable 107 may comprise an active executable and the executable 108 may comprise a standby executable. The standby executable may be a backup copy of the active executable. The manager component 104 in one example selects the processor 110 to run the active executable. Since the active executable is running on the processor 110, the manager component 104 needs to select one of the other available processors to run the standby executable. The manager component 104 may select one of the available processors for the standby executable based on one or more characteristics of the standby executable and/or the available processors. The manager component 104 in one example selects the processor 112 to run the standby executable based on the characteristics of the standby executable. Therefore, the active executable and the standby executable are running on different processors. If one of the processors 110 and 112 were to fail, then the distributed software application 102 would still have one of the active-standby pair for operation. For example, if the processor 110 that runs the active executable goes down, then the standby executable on the processor 112 would become active.

In still another example, the one or more of the executables 106, 107 and 108 under control of the management infrastructure 103 may need to be run on a same processor or different processors than the executables under the control of another management infrastructure. Therefore, upon assigning an executable to one of the processors 110 and 112, the other management infrastructure may send an indication to the manager component 104. The manager component 104 may select one of the processors for one of the executables 106, 107 and 108 based on the processor selection by the other management infrastructure. Therefore, the management infrastructure 103 and the other management infrastructure cooperate to assign executables to the processors 110 and 112.

At STEP 212, once the manager component 104 has selected the processor 110 to run the executable 107, the manager component 104 sends a message to the executable manager 114 running on the processor 110 to instruct the executable manager 114 to start running the executable 107 on the processor 110. For example, the manager component 104 sends the message to the communication interface 118 of the executable manager 114. Under instruction of the manager component 107, the executable manager 114 creates and starts up the executable 107 on the processor 110, as will be appreciated by those skilled in the art.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the manager component 104. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising: a manager component for a distributed software application, that runs on a multi-processor system, that based on one or more of: a characteristic of an executable of the distributed software application; and a characteristic of one or more of a plurality of processors;
   selects, after receipt of a list of valid processors for the executable, a processor from the plurality of processors to run the executable upon startup of the distributed software application based on an instruction to run the executable only on the processor;
   wherein the distributed software application comprises a call processing software application, and wherein the call processing software application sets up or tears down telecommunication sessions in a telecommunication network; and wherein the manager component employs up to date information of the multi-processor system to select the processor;
      wherein the manager component comprises a high availability manager component operating in a high availability infrastructure; and wherein the high availability manager component dynamically selects, at runtime of the distributed software application, the processor from the plurality of processors to run the executable.

2. The apparatus of claim 1, wherein the processor comprises a first processor, and wherein the startup comprises a first startup; and wherein upon the first startup of the distributed software application, the manager component dynamically selects the first processor to run the executable; and wherein upon a second startup of the distributed software application, the manager component dynamically selects a second processor from the plurality of processors to run the executable.

3. The apparatus of claim 2, wherein between the first startup and the second startup, one or more of the characteristic of the executable and/or the characteristic of one or more of the plurality of processors have changed resulting in the manager component selecting the second processor to run the executable at the second startup instead of the first processor.

4. The apparatus of claim 1, wherein the processor comprises a first processor, and wherein the executable comprises a first executable, and wherein the distributed software application comprises the first executable and a second executable; and wherein the manager component, based on one or more of:
   a characteristic of the second executable; and
   a characteristic of one or more of the plurality of processors;
   dynamically selects a second processor from the plurality of processors to run the second executable upon startup of the distributed software application.

5. The apparatus of claim 1, wherein the distributed software application comprises a plurality of executables, and Wherein the plurality of executables comprises the executable; and wherein the manager component load balances the plurality of executables across the plurality of processors.

6. The apparatus of claim 1, wherein the processor comprises a first processor, and wherein the plurality of processors comprises the first processor and a second processor; and wherein the manager component queries the first processor for a load value of the first processor, and wherein the manager component queries the second processor for a load value of the second processor; and wherein upon determination that the load value of the first processor is lower than the load value of the second processor, the manager component selects the first processor to run the executable.

7. The apparatus of claim 1, wherein the distributed software application comprises a plurality of executables, and wherein the plurality of executables comprises the executable; and wherein the processor comprises a first processor, and wherein the plurality of processors comprises the first processor and a second processor; and wherein upon determination that the first processor is running fewer of the plurality of executables than the second processor, the manager component selects the first processor to run the executable.

8. The apparatus of claim 1, wherein the distributed software application comprises a plurality of software components within a plurality of executables, and wherein the plurality of executables comprises the executable; and
    wherein the processor comprises a first processor, and wherein the plurality of processors comprises the first processor and a second processor; and
    wherein the plurality of software components comprise one or more software components of the executable; and
    wherein upon determination that the first processor is running fewer of the plurality of software components than the second processor, the manager component selects the first processor to run the one or more software components of the executable.

9. The apparatus of claim 1, wherein the executable comprises a first executable, and wherein the distributed software application comprises the first executable and a second executable; and wherein the manager component receives an instruction to run the first executable on a same processor as the second executable, and wherein the second executable is assigned to run on the processor of the plurality of processors; and
    wherein the manager component selects the processor from the plurality of processors to run the first executable since the second executable is running on the processor.

10. The apparatus of claim 1, wherein the executable 2 comprises a first executable, and wherein the distributed software application compromises the first executable and a second executable; and wherein the processor comprises a first processor, and wherein the plurality of processors comprises the first processor and a second processor; and wherein the manager component receives an instruction to run the first executable on a different processor than the second executable, and wherein the second executable is assigned to run on the second processor of the plurality of processors; and wherein the manager component selects the first processor from the plurality of processors to run the first executable since the second executable is running on the second processor.

11. The apparatus of claim 1, wherein the manager component sends a message to an executable manager running on the processor to instruct the executable manager to start running the executable on the processor, and wherein the executable manager starts up the executable on the processor.

12. The apparatus of claim 1, wherein the processor comprises a first processor, and wherein the plurality of processors comprises the first processor and a second processor, and wherein the executable comprises an active executable, and wherein the distributed software application comprises the active executable and a standby executable, and wherein the standby executable comprises a backup copy of the active executable; and wherein the manager component selects the first processor from the plurality of processors to run the active executable, and wherein the manager component selects the second processor from the plurality of processors to run the standby executable to keep the standby executable on a different processor than the active executable.

13. The apparatus of claim 1, wherein the manager component imports a configuration file that comprises an indication that the executable is able to run on one or more of the plurality of processors; and wherein the manager component employs load information of the one or more of the plurality of processors to select the processor from the one or more of the plurality of processors to run the executable.

14. The apparatus of claim 1, wherein a first management infrastructure comprises the manager component, and wherein the executable comprises a first executable; and wherein a second management infrastructure assigns a second executable to one of the plurality of processors, and wherein the second management infrastructure sends assignment information associated with the second executable to the manager component; and wherein the manager component of the first management infrastructure dynamically selects one of the plurality of processors to run the first executable based on the assignment information of the second executable received from the second management infrastructure.

15. A method, comprising the steps of:
    determining one or more characteristics of one or more of a plurality of processors that run a distributed software application; and selecting, at runtime of the distributed software application and based on one or more of the one or more characteristics, a processor from the plurality of processors to run an executable of the distributed software application after receipt of a list of valid processors for the executable and an instruction to run the executable only on the processor; wherein the distributed software application comprises a call processing software application, and wherein the call processing software application sets up and/or tears down telecommunication sessions In a telecommunication network; and wherein a manager component for the distributed software application, that runs on a multi-processor system, employs up to date information of the multi-processor system to select the processor;
    wherein the manager component comprises a high availability manager component operating in a high availability infrastructure; and wherein the high availability manager component dynamically selects, at runtime of the distributed software application, the processor from the plurality of processors to run the executable.

16. The method of claim 15, wherein the processor comprises a first processor, and wherein the plurality of processors comprises the first processor and a second processor; and wherein the step of determining the one or more characteristics of the one or more of the plurality of processors that run the distributed software application comprises the steps of:
    querying the first processor for a load value of the first processor; and querying the second processor for a load value of the second processor; wherein the step of selecting, at runtime of the distributed software application and based on the one or more of the one or more characteristics, the processor from the plurality of processors to run the executable of the distributed software application comprises the steps of: selecting the first processor to run the executable upon determination that the load value of the first processor is lower than the load value of the second processor; and sending a message to an executable manager on the first processor to instruct the executable manager to start up the executable.

17. The method of claim 15, wherein the distributed software application comprises a plurality of executables, and wherein the plurality of executables comprises the executable, and wherein the processor comprises a first processor, and wherein the plurality of processors comprises the first processor and a second processor; and wherein the step of selecting, at runtime of the distributed software application and based on the one or more of the one or more characteristics, the processor from the plurality of processors to run the executable of the distributed software application comprises the steps of: selecting the first processor to run the executable upon determination that the first processor is running fewer of the plurality of executables than the second processor; and sending a message to an executable manager on the first processor to instruct the executable manager to start up the executable.

18. A method, comprising the steps of: determining one or more characteristics of an executable of a distributed software application; and selecting, at runtime of the distributed software application and based on one or more of the one or more characteristics, a processor from a plurality of processors to run the executable after receipt of a list of valid processors for the executable and an instruction to run the executable only on the processor; wherein the distributed software application comprises a call processing software application, and wherein the call processing software application sets up and/or tears clown telecommunication sessions in a telecommunication network; and wherein a manager component for the distributed software application, that runs on a multi-processor system, employs up to date information of the multi-processor system to select the processor;

wherein the manager component comprises a high availability manager component operating in a high availability infrastructure; and wherein the high availability manager component dynamically selects, at runtime of the distributed software application, the processor from the plurality of processors to run the executable.

19. The method of claim 18, wherein the executable comprises a first executable, and wherein the distributed software application comprises the first executable and a second executable; and wherein the step of determining the one or more characteristics of the executable of the distributed software application comprises the steps of: importing a configuration file that indicates that the first executable is to be run with the second executables on a same processor; and determining that the second executable is assigned to run on the processor of the plurality of processors;

wherein the step of selecting, at runtime of the distributed software application and based on the one or more of the one or more characteristics, the processor from the plurality of processors to run the executable comprises the steps of:

choosing the processor from the plurality of processors to run the first executable on the processor with the second executable; and sending a message to an executable manager on the processor to instruct the executable manager to start up the executable.

20. The apparatus of claim 1, wherein the manager component selects the processor from the plurality of processors for the executable based on an active-standby relationship between two executables.

21. The apparatus of claim 1, wherein the manager component employs load information of the plurality of processors to choose the processor for the executable.

22. The apparatus of claim 1, wherein the executable is free from a fixed pre-assignment to any one of the processors of the plurality of processors.

23. The apparatus of claim 1, wherein the management component keeps related executables on a same processor.

* * * * *

UNITED STATES PATENT AND TRADEMARK OFFICE
CERTIFICATE OF CORRECTION

PATENT NO. : 7,614,055 B2
APPLICATION NO. : 10/868404
DATED : November 3, 2009
INVENTOR(S) : Buskens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Nineteenth Day of October, 2010

David J. Kappos
*Director of the United States Patent and Trademark Office*